US012759710B2

(12) United States Patent
Stephens et al.

(10) Patent No.: US 12,759,710 B2
(45) Date of Patent: Oct. 13, 2026

(54) RECLINING SEAT STRUCTURE AND METHODS THEREOF

(71) Applicant: Supernal, LLC, Washington, DC (US)

(72) Inventors: Benjamin David Stephens, Irvine, CA (US); Alexander Pozzi, Carlsbad, CA (US)

(73) Assignee: Supernal, LLC, Irvine, CA (US)

( * ) Notice: Subject to any disclaimer, the term of this patent is extended or adjusted under 35 U.S.C. 154(b) by 209 days.

(21) Appl. No.: 18/444,123

(22) Filed: Feb. 16, 2024

(65) Prior Publication Data

US 2024/0278919 A1 Aug. 22, 2024

Related U.S. Application Data

(60) Provisional application No. 63/485,458, filed on Feb. 16, 2023.

(51) Int. Cl.
*B64D 11/06* (2006.01)

(52) U.S. Cl.
CPC .................................. *B64D 11/064* (2014.12)

(58) Field of Classification Search
CPC .... B60N 2/10; B60N 2/20; B60N 2/22; A47C 1/024; A47C 7/48; B64D 11/064
USPC ..................................................... 297/354.11
See application file for complete search history.

(56) References Cited

U.S. PATENT DOCUMENTS

| | | | | |
|---|---|---|---|---|
| 4,291,916 A * | 9/1981 | Chardon | B64D 11/064 | 297/367 R |
| 5,310,246 A * | 5/1994 | Tseng | A47C 1/0265 | 297/411.42 |
| 8,186,754 B2 * | 5/2012 | Sharrow | A47C 4/04 | 297/23 |
| 12,077,303 B2 * | 9/2024 | Parker | B64D 11/064 | |
| 2003/0057757 A1 * | 3/2003 | Martin | A47C 1/023 | 297/354.12 |

FOREIGN PATENT DOCUMENTS

| | | | | |
|---|---|---|---|---|
| DE | 4018724 C1 * | 5/1991 | A47C 3/36 |
| EP | 4289742 A1 * | 12/2023 | B64D 11/064 |
| WO | WO-2012040884 A1 * | 4/2012 | A47C 1/026 |

* cited by examiner

*Primary Examiner* — Joshua D Huson
(74) *Attorney, Agent, or Firm* — Bookoff McAndrews, PLLC

(57) ABSTRACT

A reclining seat comprising a back portion including a plurality of sidewalls; a seat portion; a plurality of legs, wherein each of the plurality of legs is attached to a sidewall of the back portion; a pivot configured to allow a portion of the seat to recline; and a recline mechanism, the recline mechanism including a recline positioner including a plurality of recesses, and a recline adjustment pin, wherein the recline adjustment pin is configured to fit into at least one of the plurality of recesses of the recline positioner.

18 Claims, 8 Drawing Sheets

RECLINING SEAT STRUCTURE AND METHODS THEREOF

CROSS REFERENCE TO RELATED APPLICATION

This application claims priority to U.S. Provisional Application No. 63/485,458, filed on Feb. 16, 2023, which is incorporated by reference herein in its entirety.

TECHNICAL FIELD

Embodiments of this disclosure are directed to seat structures, specifically, a reclining seat structure for an aircraft and uses thereof.

INTRODUCTION

Aircraft seat structures have different configurations and features based on what type of aircraft they are used in. Seats in a smaller aircraft, e.g., a helicopter, do not recline as they are designed to withstand more impact than traditional seats used in commercial airplanes. Helicopter seats are configured to move solely in a vertical direction. In the event of a crash, helicopter seats stroke or deflect in an effort to absorb some of the seat motion, so that a portion of the motion does not transfer to the passenger during a hard landing. Such mechanisms included in the helicopter seats to absorb motion may include, e.g., a gas spring, a bouncer, etc. However, traditional helicopter seats do not include mechanisms for passenger comfort, e.g., mechanisms to recline a portion of the seat. There is a desire to design seats, e.g., helicopter seats and seats for vertical take-off and landing aircraft, to provide both safety and comfort to passengers.

SUMMARY OF THE DISCLOSURE

The present disclosure describes a reclining seat comprising a back portion including a plurality of sidewalls; a seat portion; a plurality of legs, wherein each of the plurality of legs is attached to a sidewall of the back portion; a pivot configured to allow a portion of the seat to recline; and a recline mechanism, the recline mechanism including a recline positioner including a plurality of recesses, and a recline adjustment pin, wherein the recline adjustment pin is configured to fit into at least one of the plurality of recesses of the recline positioner.

Various embodiments of the reclining seat may include one or more of the following features. The back portion may include a first sidewall and a second sidewall, and the plurality of legs may include a first leg and a second leg, and wherein the first leg is attached to a first sidewall and the second leg is attached to the second sidewall. The first leg may be attached to an interior portion of the first sidewall and the second leg may be attached to an interior portion of the second sidewall. The first leg may be attached to an exterior portion of the first sidewall and the second leg may be attached to an exterior portion of the second sidewall. The recline mechanism may further include an energy absorbing member and a plurality of feet. The recline mechanism may further include an adapter for receiving the recline adjustment pin. Each leg of the plurality of legs may include a track for receiving at least one component of the recline mechanism. Each recess of the plurality of recesses may correspond to a pre-determined recline position. The recline mechanism may be a first recline mechanism and the seat may include a second recline mechanism.

The present disclosure also describes a seat for an aircraft, the seat comprising a back portion; a seat portion; a plurality of legs; a pivot configured to allow a portion of the seat to recline; and a plurality of recline mechanisms, each recline mechanism including an energy absorbing member, a plurality of feet, a recline positioner including a plurality of recesses, and a recline adjustment pin.

Various embodiments of the seat may include one or more of the following features. The recline adjustment pin may be configured to fit into at least one of the plurality of recesses of the recline positioner. The plurality of recesses may correspond to pre-determined recline positions. The back portion may include a first sidewall and a second sidewall and the plurality of legs may include a first leg and a second leg, and wherein the first leg may be attached to an interior portion of the first sidewall and the second leg may be attached to an interior portion of the second sidewall. The seat may include at least two recline mechanism and a first recline mechanism may attach the first leg to the first sidewall and a second recline mechanism may attach the second leg to the second sidewall. Each of the plurality of legs may include a track for receiving the plurality of feet of the recline mechanism.

The present disclosure also describes a seat for an aircraft, the seat comprising a back portion; a seat portion; a plurality of legs; a pivot configured to allow a portion of the seat to recline; and a plurality of recline mechanisms, each recline mechanism including an adapter including an insert portion, a recline positioner including a plurality of recesses, and a recline adjustment pin, wherein each of the plurality of legs includes a track for receiving the insert portion of the adapter.

Various embodiments of the seat may include one or more of the following features. The recline adjustment pin may be configured to fit into at least one of the plurality of recesses of the recline positioner. The plurality of recesses may correspond to pre-determined recline positions. The back portion may include a first sidewall and a second sidewall and the plurality of legs may include a first leg and a second leg, and wherein the first leg may be attached to an exterior portion of the first sidewall and the second leg may be attached to an exterior portion of the second sidewall. The seat may include at least two recline mechanisms, wherein a first recline mechanism attaches the first leg to the first sidewall and a second recline mechanism attaches the second leg to the second sidewall.

BRIEF DESCRIPTION OF THE FIGURES

The accompanying drawings, which are incorporated in and constitute a part of this specification, illustrate various examples and, together with the description, serve to explain the principles of the disclosed examples and embodiments.

Aspects of the disclosure may be implemented in connection with embodiments illustrated in the attached drawings. These drawings show different aspects of the present disclosure and, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure.

Moreover, there are many embodiments described and illustrated herein. The present disclosure is neither limited to any single aspect or embodiment thereof, nor is it limited to any combinations and/or permutations of such aspects and/ or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended to reflect or indicate the embodiment(s) is/are "example" embodiment (s).

Figure 1A:
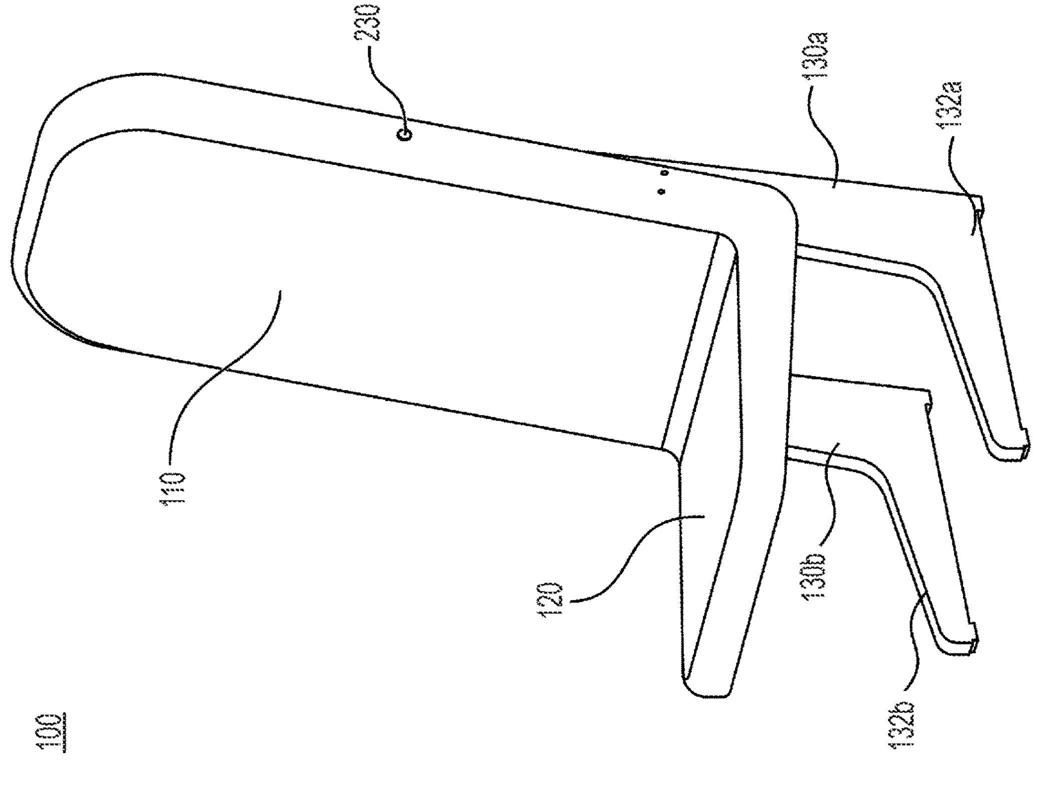
Figure 1B:
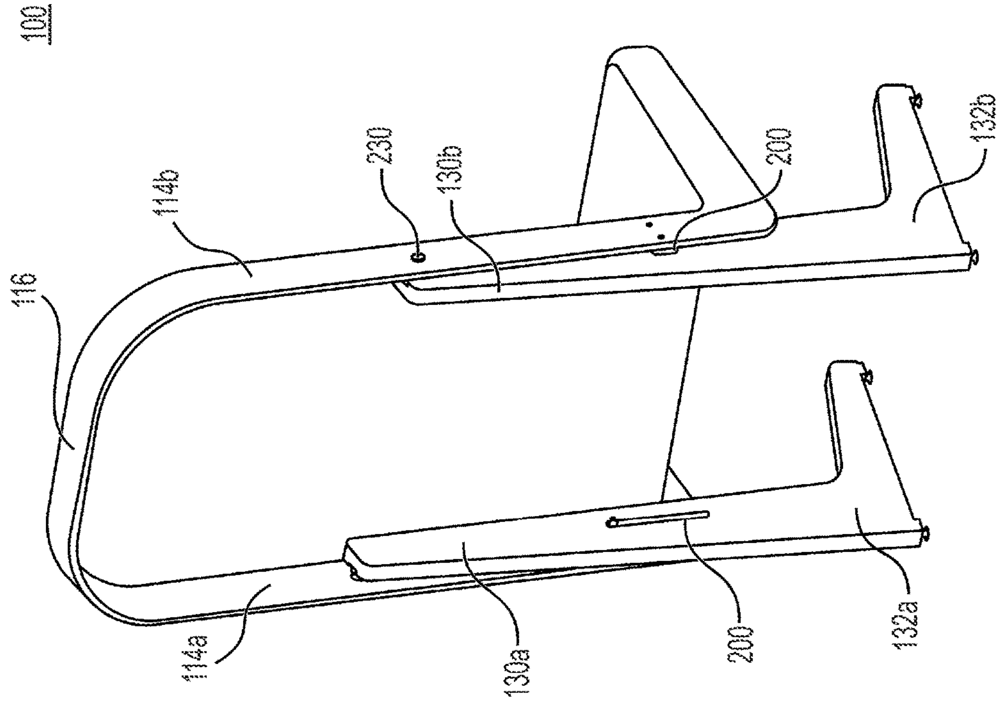

FIG. 1A is a perspective front view of a seat and FIG. 1B is a perspective rear view of the seat, according to embodiments of the present disclosure.

Figure 2:
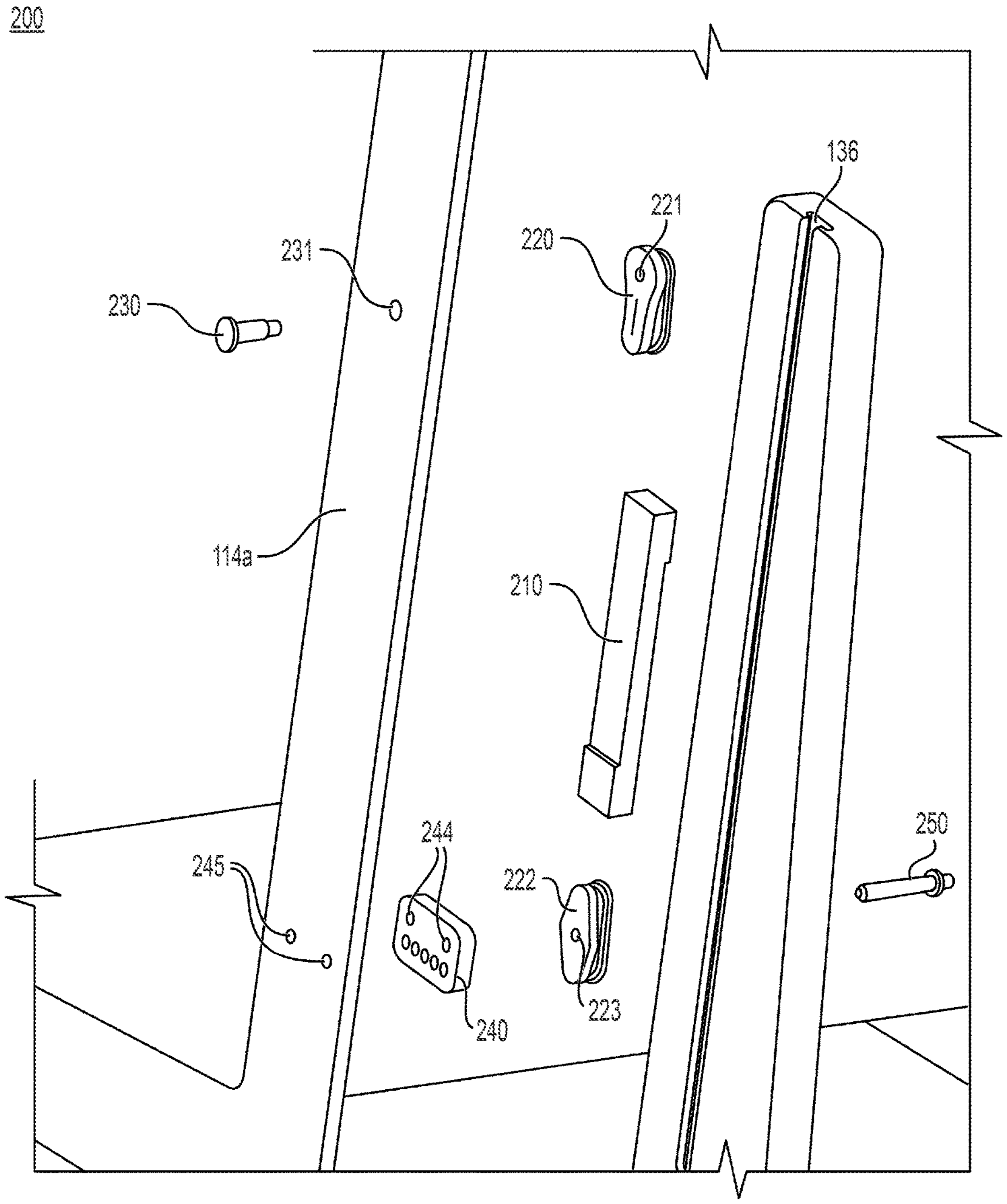

FIG. 2 is a detailed view of the seat and a recline mechanism according to embodiments of the present disclosure.

Figure 3B:
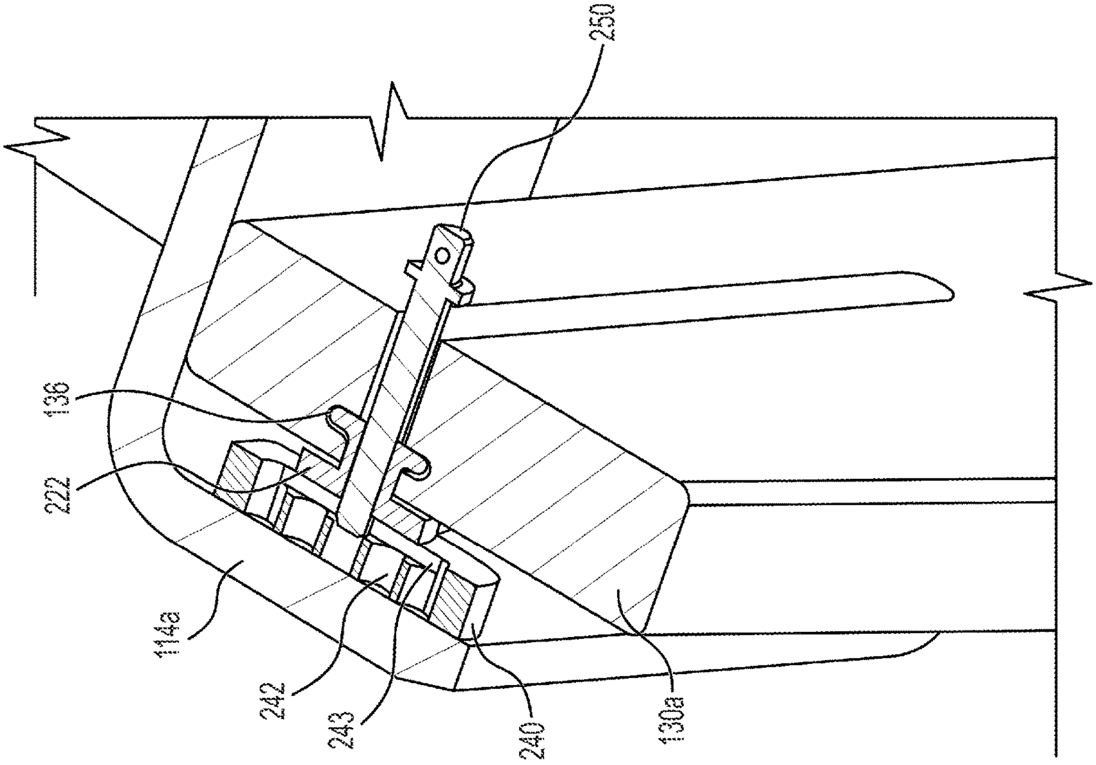
Figure 3A:
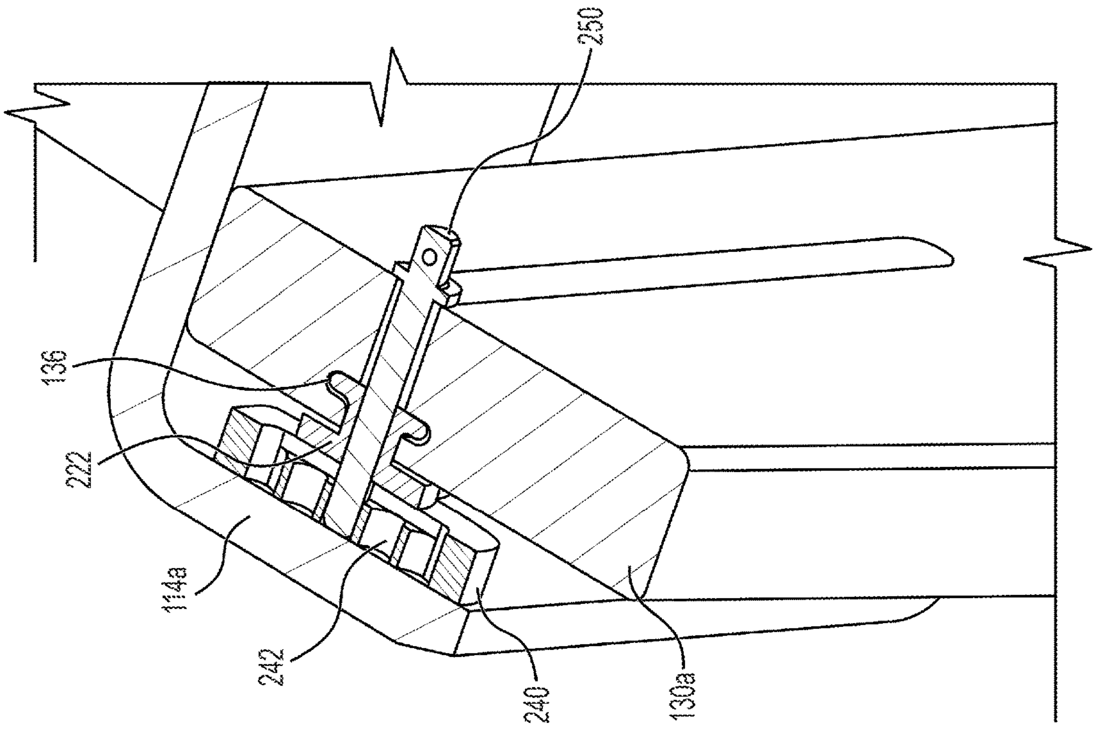

FIGS. 3A and 3B are cross-sectional views of the recline mechanism of FIG. 2, according to embodiments of the present disclosure.

Figure 4B:
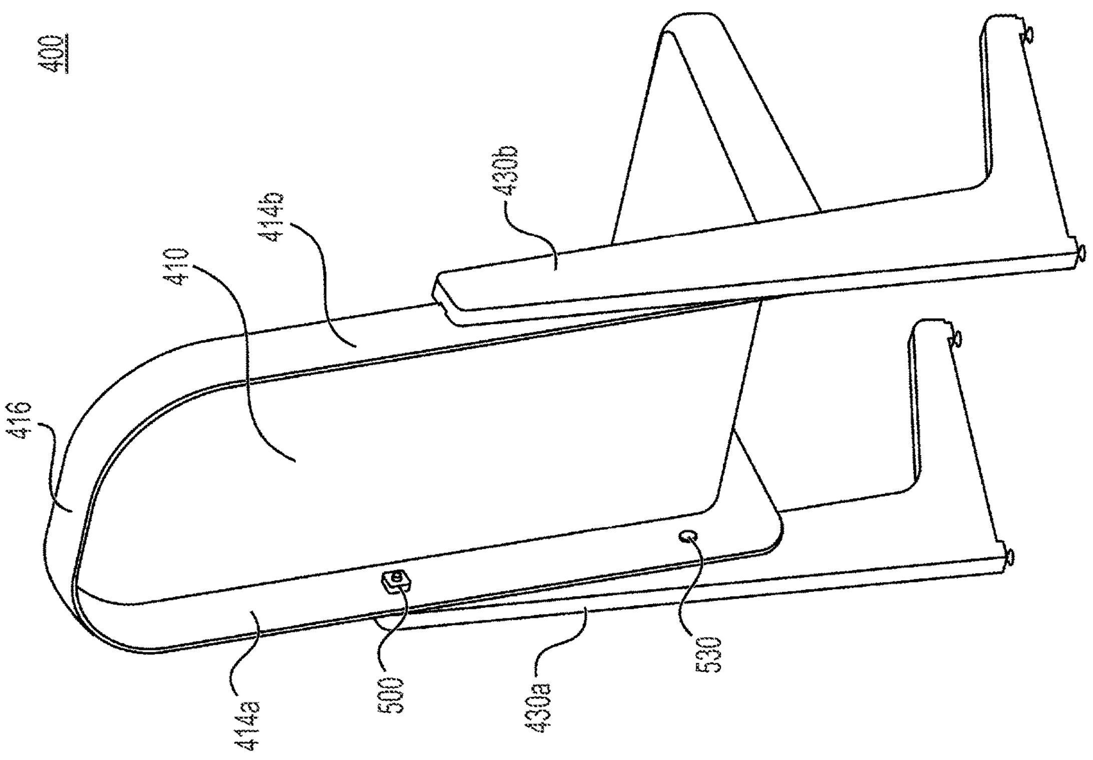
Figure 4A:
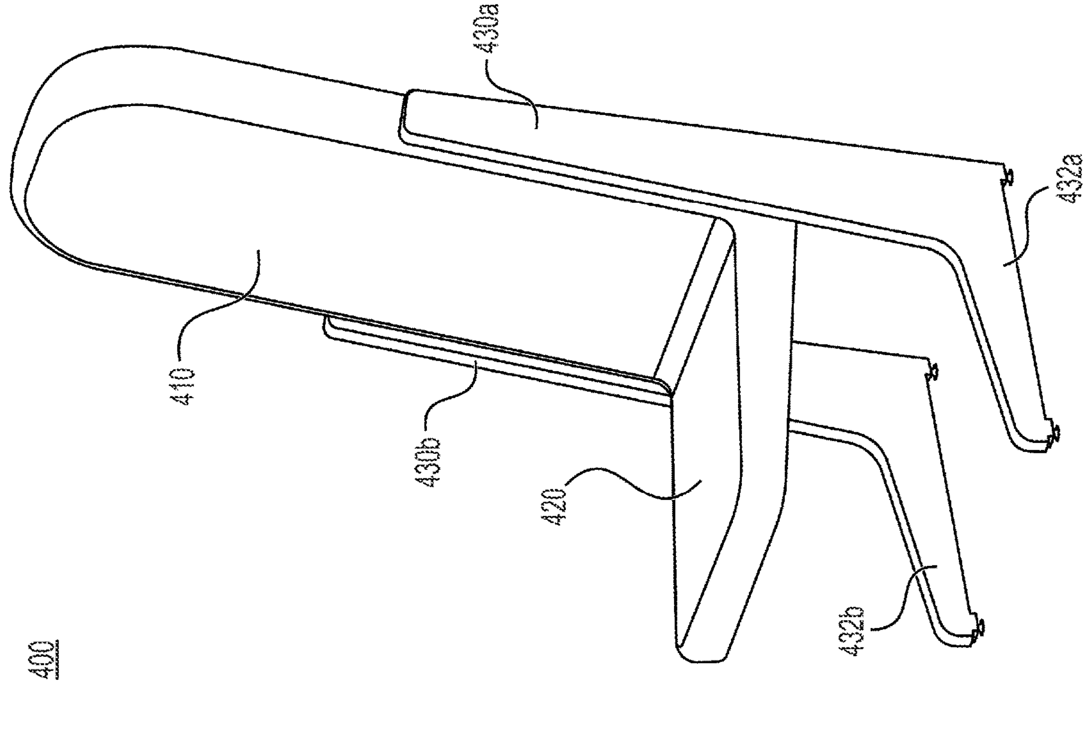

FIG. 4A is a perspective front view of a seat and FIG. 4B is a perspective rear view of the seat, according to embodiments of the present disclosure.

Figure 5:
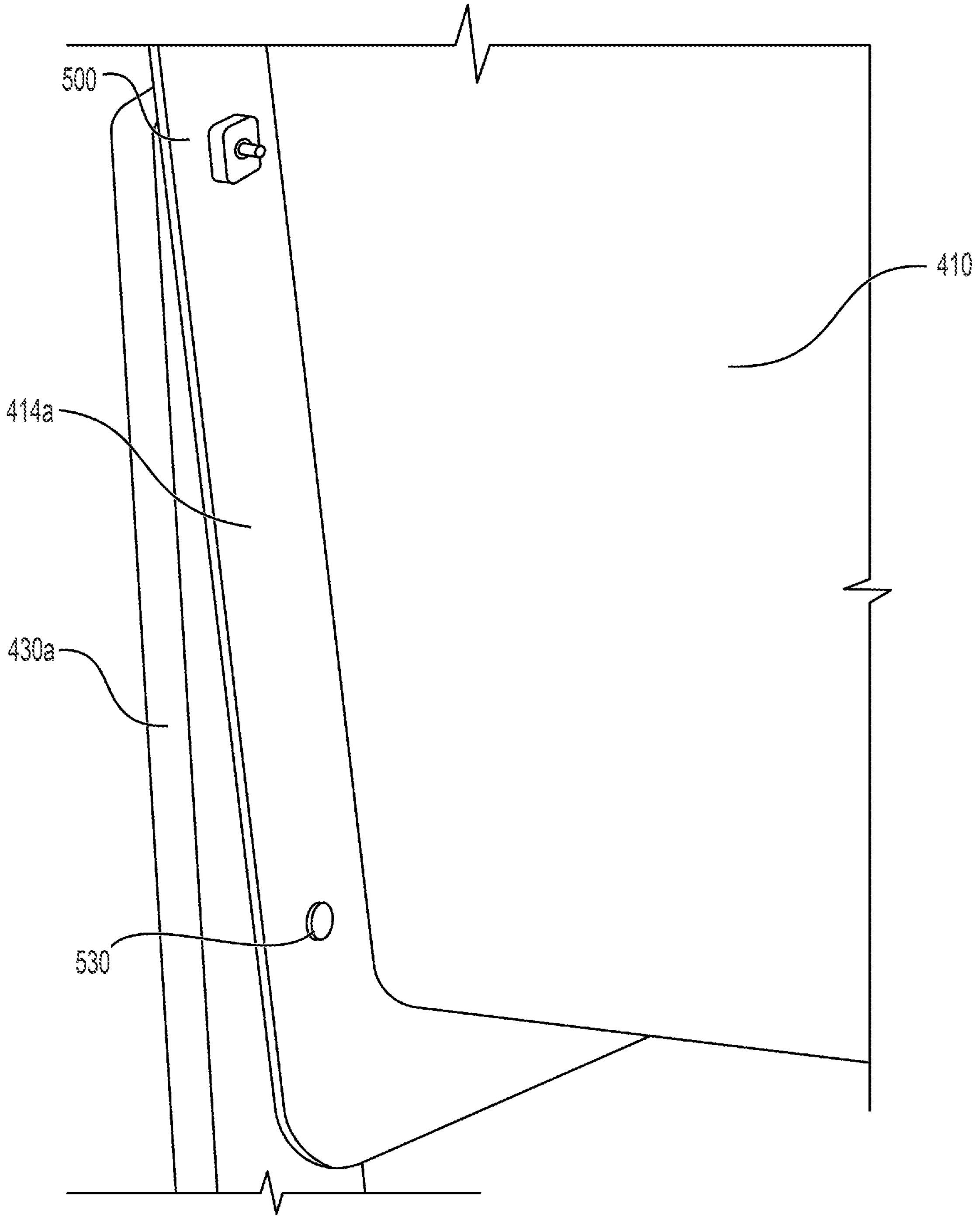

FIG. 5 is a detailed rear view of a portion of the seat according to embodiments of the present disclosure.

Figure 6:
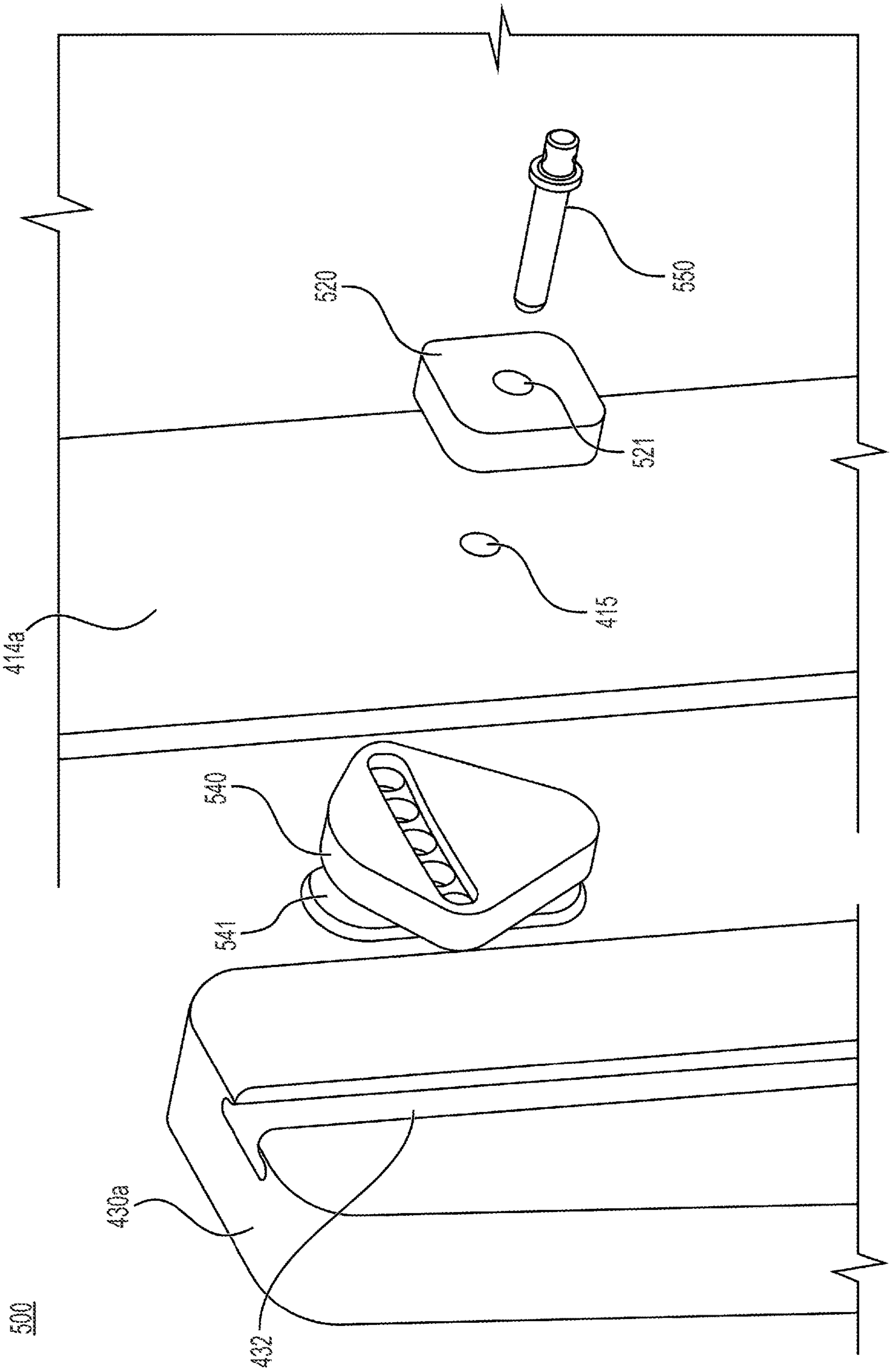

FIG. 6 is an exploded view of a recline mechanism according to embodiments of the present disclosure.

Figure 7B:
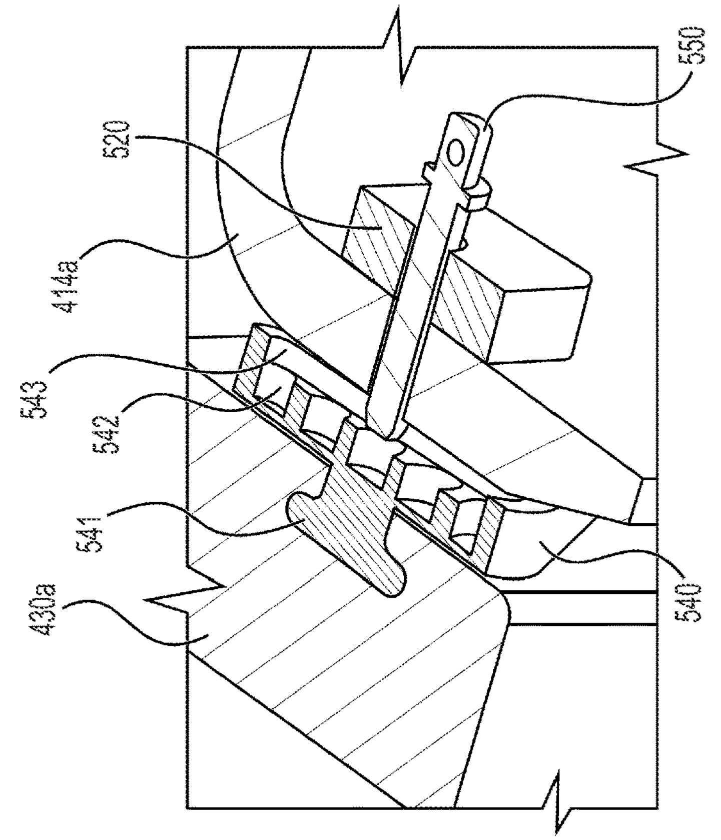
Figure 7A:
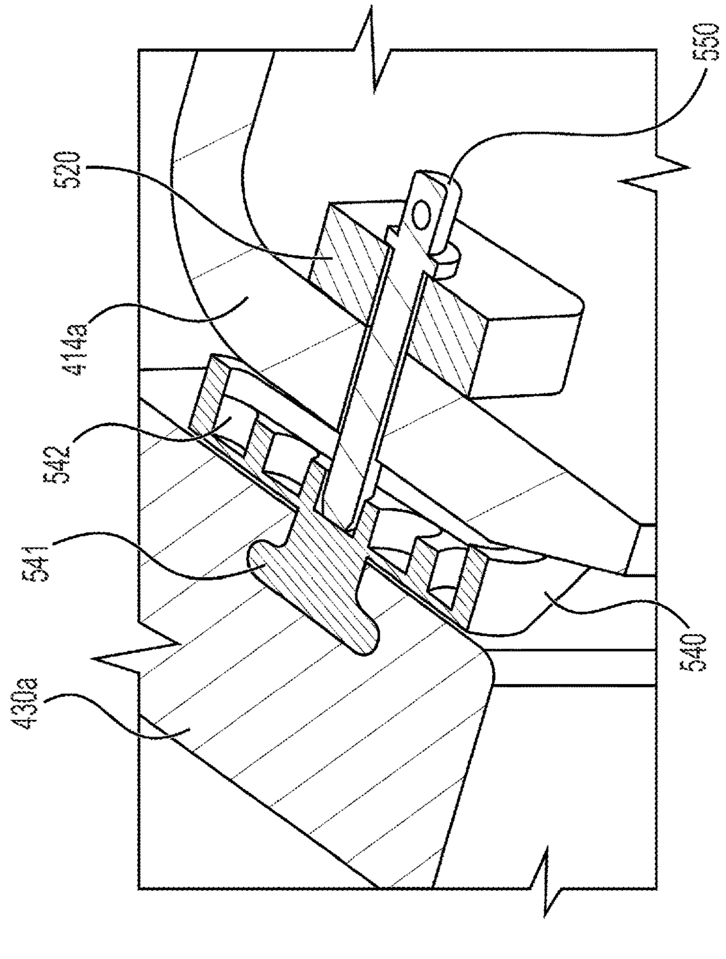

FIGS. 7A and 7B are cross-sectional views of the recline mechanism of FIG. 6, according to embodiments of the present disclosure.

Figure 8:
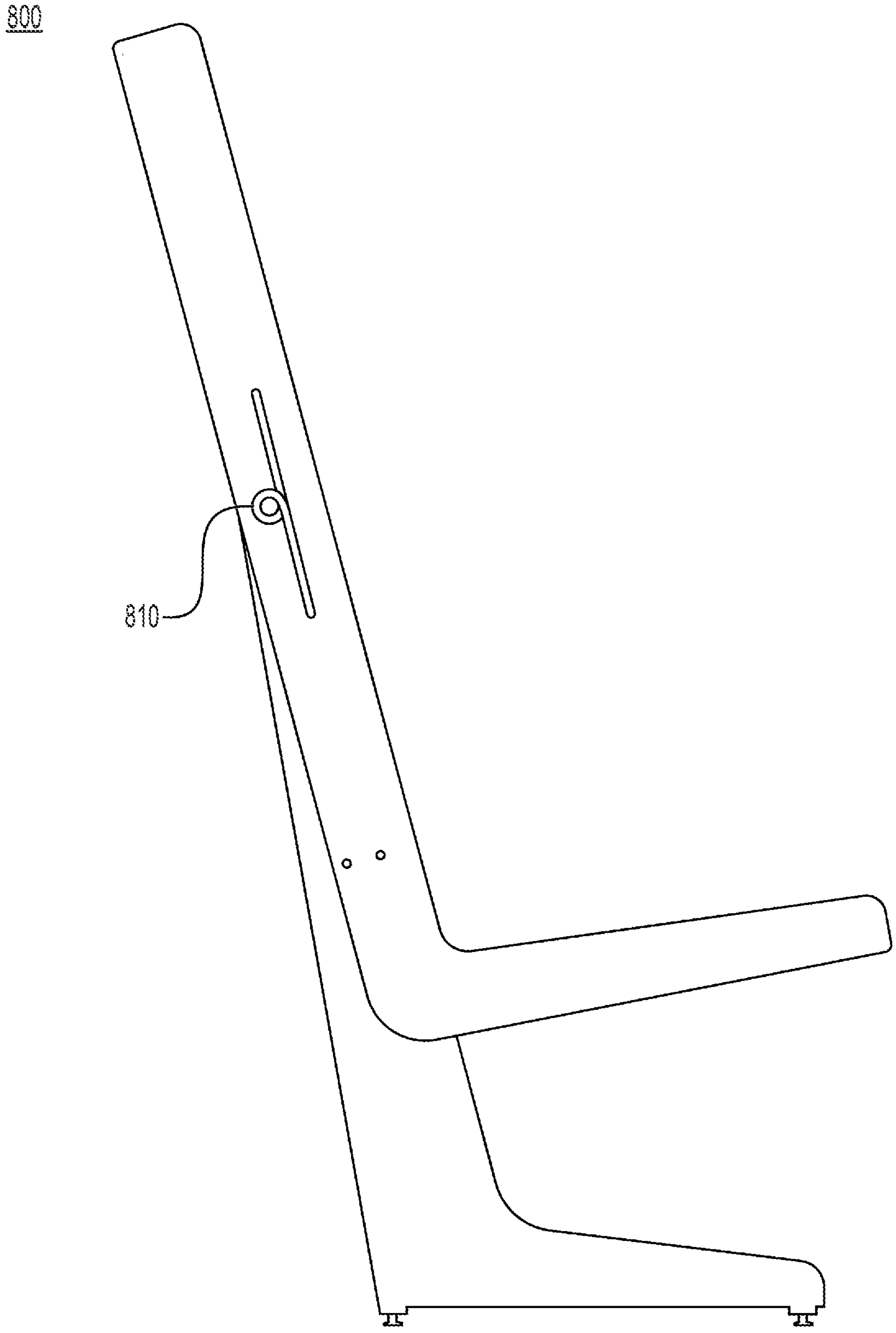

FIG. 8 is a side view of a seat according to embodiments of the present disclosure.

As used herein, the terms "comprises," "comprising," "includes," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." In addition, the terms "first," "second," and the like, herein do not denote any order, quantity, or importance, but rather are used to distinguish an element or a structure from another. Moreover, the terms "a" and "an" herein do not denote a limitation of quantity, but rather denote the presence of one or more of the referenced items.

Notably, for simplicity and clarity of illustration, certain aspects of the figures depict the general structure and/or manner of construction of the various embodiments. Descriptions and details of well-known features and techniques may be omitted to avoid unnecessarily obscuring other features. Elements in the figures are not necessarily drawn to scale; the dimensions of some features may be exaggerated relative to other elements to improve understanding of the example embodiments. For example, one of ordinary skill in the art appreciates that the side views are not drawn to scale and should not be viewed as representing proportional relationships between different components. The side views are provided to help illustrate the various components of the depicted assembly, and to show their relative positioning to one another.

DETAILED DESCRIPTION

Reference will now be made in detail to examples of the present disclosure, which are illustrated in the accompanying drawings. Wherever possible, the same reference numbers will be used throughout the drawings to refer to the same or like parts. In the discussion that follows, relative terms such as "about," "substantially," "approximately," etc. are used to indicate a possible variation of a numerical range in a stated numeric value, as will be designated below.

As discussed above, seats traditionally used in smaller aircrafts, e.g., helicopters, are designed to withstand more impact than seats on larger, commercial airplanes. Helicopter seats are configured to only move in a vertical direction, to absorb motion and/or shock caused by turbulence during takeoff, and/or landing, and to withstand extreme impact from a crash or hard landing. These seats include mechanisms to stroke or deflect in an effort to absorb some of the seat motion. Such shock mechanisms included in the helicopter seats to absorb motion may include, e.g., a gas spring, a bouncer, or any other appropriate energy-absorbing member. While these shock mechanisms are very important for the safety of the passenger, such seats are not comfortable. In helicopter seats, for example, the energy-absorbing members may be large and take up a significant portion of the seat, so that the seats cannot be configured to move, i.e., recline. Further, during takeoff and landing, helicopter seats may be positioned to ensure proper safety and shock absorption. Designing helicopter seats to recline may cause unnecessary and unwanted problems. For example, traditional helicopter seats may not move freely as this may impact the safety and shock mechanisms, e.g., thereby reducing the shock absorbency of the seat. To reconfigure traditional helicopter seats, any reclined position of the seat must satisfy all safety requirements and ensure any safety and shock mechanisms may properly function.

Although the present disclosure references a seat for an aircraft, those of ordinary skill in the art will readily recognize that the concepts of the present disclosure may be utilized in configurations and designs where a reclining seat that provides both safety and comfort for a user is needed. Moreover, although the present disclosure makes reference to a small plane or a helicopter, those of ordinary skill in the art will readily recognize that reference to a small plane or a helicopter is exemplary, and that the concepts of the present disclosure may be used in conjunction with any suitable or comparable aircraft, e.g., commercial airplanes or electrical vertical takeoff and landing aircrafts (eVTOL aircrafts).

Embodiments of the present disclosure relate to a seat, and, in particular, a seat for an aircraft (e.g., a helicopter, small aircrafts). FIG. 1A depicts a front view of a seat 100 and FIG. 1B depicts a rear view of seat 100. Seat 100 may include a back portion 110, a seat portion 120, and a plurality of legs 130*a*, 130*b* (FIGS. 1A and 1B). Each leg 130*a*, 130*b* may include a foot portion 132*a*, 132*b*. Back portion 110 may include a plurality of sidewalls 114*a*, 114*b*, and a top wall 116. As shown in FIG. 1A, seat 100 may include a first leg 130*a* and a second leg 130*b*. In some embodiments, legs 130*a*, 130*b* may be attached to sidewalls 114*a*, 114*b*. Referring to FIG. 1B, first leg 130*a* may be attached to an inner surface of sidewall 114*a* and second leg 130*b* may be attached to an inner surface sidewall 114*b*.

Seats according to the present disclosure may be of any size conforming to Federal Aviation Administration (FAA) standards and safety standards. The seats, including the legs and feet, may have a width ranging from about 14 inches to about 20 inches. For example, a width of the seat may range from about 14 inches to about 18 inches, about 14 inches to about 16 inches, about 16 inches to about 20 inches, or about 16 inches to about 18 inches. In some examples, a width of the seat may be about 14 inches, about 15 inches, about 16 inches, about 17 inches, about 18 inches, about 19 inches, or about 20 inches. A portion of the seat, e.g., a bullnose of the seat may have a distance, i.e., a height, relative to a distal surface, e.g., a floor of an aircraft, ranging from about 8 inches to about 18 inches from the floor. For example, the distance may range from about 8 inches to about 16 inches, about 10 inches to about 18 inches, about 10 inches to about 16 inches, about 12 inches to about 18 inches, or about 12 inches to about 16 inches. In some examples, the distance of the seat from a distal surface may be about 8 inches, about 9 inches, about 10 inches, about 11 inches, about 12 inches, about 13 inches, about 14 inches, about 15 inches, or about 16 inches.

Seat 100 may include a recline mechanism 200. As shown in FIG. 1B, seat 100 may include a plurality of recline mechanisms 200, where first leg 130*a* may be attached to sidewall 114*a* by a first recline mechanism 200 and second leg 130*b* may be attached to sidewall 114*b* by a second recline mechanism 200. The recline mechanisms 200 may be substantially similar, or, in some embodiments, may include variations for a given seat. In some embodiments, legs 130*a*, 130*b* may be attached to an interior portion of corresponding sidewalls 114*a*, 114*b* (FIG. 1B). Referring to FIG. 2, each leg 130*a*, 130*b* may include a track 136 for engaging with components of recline mechanism 200. Track 136 may extend along a portion of leg 130*a*, 130*b* on a surface facing leg 114*a*, 114*b*. For example, track 136 may extend along an entire length of leg 130*a*, 130*b*. Track 136 will be discussed in further detail below.

FIG. 2 depicts the components of recline mechanism 200. While FIG. 2 shows recline mechanism 200, sidewall 114*a*, and leg 130*a*, the discussion herein may also apply to the use of recline mechanism 200 with sidewall 114*b* and leg 130*b*. Recline mechanism 200 may include an energy absorbing member 210, a first foot 220, a second foot 222, a recline positioner 240, and a recline adjustment pin 250.

Referring to FIGS. 2, 3A, and 3B, track 136 of each leg 130*a*, 130*b* may be configured to receive a portion of energy absorbing member 210, first foot 220, and/or second foot 222. For example, first foot 220 and second foot 222 may slide along track 136 while energy absorbing member 210 absorbs energy during the flight, e.g., energy caused by turbulence, takeoff, and/or landing. A portion of first foot 220 and/or a portion second foot 222 may sit in track 136. In other examples, first foot 220 and/or second foot 222 may fit entirely into track 136. In some examples, energy absorbing member 210 may be a one-time use mechanism to absorb energy during a hard landing. Energy absorbing member 210 may be replaceable. For example, once energy absorbing member 210 is activated to absorb energy, energy absorbing member 210 deforms, i.e., depresses, and can no longer be used. Energy absorbing member 210 may also assist in inhibiting a passenger's back from compressing during, e.g., a crash. As mentioned above, traditional seats do not recline because of the presence of an energy absorbing member. Energy absorbing members in traditional seats may be too large, i.e., may take up too much space of the seat, so that the seat may not be configured to recline. Energy absorbing member may comprise of a metallic material, e.g., steel, aluminum, or combinations thereof. Energy absorbing member 210 as used in the embodiments of the present disclosure may have a generally rectangular shape. Referring to FIG. 2, energy absorbing member 210 may include a medial portion, a first end portion, and a second end portion. The first end portion and/or the second end portion may include an abutment extending in a direction away from the medial portion. In some examples, the first end portion may include an abutment extending in a direction away from the medial portion and the second end portion may include an abutment extending in a direction opposite of the abutment of the first end portion.

First foot 220 may have any appropriate shape and/or configuration such that a portion of first foot 220 may be received in track 136 and may be able to slide along track 136. In some embodiments, first foot 220 may include an end piece configured to be received in track 136. The end piece may also be configured such that the end piece may slide along track 136. In some examples, first foot 220 may have a generally circular, round, or oval shape. As shown in FIG. 2, first foot 220 may have a rounded end portion and an elongated portion. In some examples, the rounded end portion may include an opening 221 configured to receive an attachment means. Opening 221 may have a generally circular or round shape.

First foot 220 may have a height ranging from about 1 inch to about 5 inches. For example, a height of first foot 220 may range from about 1 inch to about 4 inches, about 1 inch to about 3 inches, about 1 inch to about 2 inches, about 2 inches to about 5 inches, about 2 inches to about 4 inches, about 2 inches to about 3 inches, about 3 inches to about 4 inches, about 3 inches to about 5 inches, or about 4 inches to about 5 inches. First foot 220 may have a weight ranging from about 0.5 inch to about 2 inches. For example, a width of first foot 220 may range from about 0.5 inch to about 1.5 inches, about 0.5 inch to about 1 inch, or about 1 inch to about 2 inches.

Referring to FIG. 2, second foot 222 may have any appropriate shape and/or configuration such that a portion of second foot 222 may be received in track 136 and may be able to slide along track 136. As shown in FIGS. 3A and 3B, second foot 222 may include a flange portion configured to be received in track 136. The flange portion may also be configured such that the flange portion may slide along track 136. Referring to FIGS. 3A and 3B, second foot 222 may have any appropriate shape and/or configuration such that a portion of second foot 222 may abut against a portion of recline positioner 240. For example, second foot 222 may have a first rounded end, a second rounded end, and a medial portion. The medial portion may include an opening 223 configured to receive an attachment means. Opening 223 may have a generally circular or round shape. Referring to FIG. 2, a width of the medial portion may be larger than a width of the first rounded end and/or the second rounded end. In some examples, the medial portion is the widest portion of second foot 222.

Second foot 222 may have a height ranging from about 1 inch to about 5 inches. For example, a height of second foot 222 may range from about 1 inch to about 4 inches, about 1 inch to about 3 inches, about 1 inch to about 2 inches, about 2 inches to about 5 inches, about 2 inches to about 4 inches, about 2 inches to about 3 inches, about 3 inches to about 4 inches, about 3 inches to about 5 inches, or about 4 inches to about 5 inches. Second foot 222 may have a weight ranging from about 0.5 inch to about 2 inches. For example, a width of second foot 222 may range from about 0.5 inch to about 1.5 inches, about 0.5 inch to about 1 inch, or about 1 inch to about 2 inches.

First foot 220 and second foot 222 may be configured according to predetermined standards, e.g., aircraft specifications or military specifications. For example, first foot 220 and second foot 222 may be configured according to Military Standard 33601 (MS 33601).

Sidewalls 114*a*, 114*b* of seat 100 may be configured to receive an attachment means. In some embodiments, first foot 220 may also be configured to receive an attachment means. The attachment means may be any means configured to attach first foot 220 to corresponding sidewall 114*a*, 114*b*. Referring to FIG. 2, sidewall 114*a* may include an opening 231 for an attachment means. The attachment means may couple sidewall 114*a* to first foot 220. In some examples, the attachment means may be a pivot 230. Pivot 230 may function as a fulcrum for seat 100. In other words, pivot 230 does not move, but allows portions of seat 100, e.g., back portion 110, to move. Pivot 230 may function similarly to a hinge. In some embodiments, pivot 230 may be reinforced to adjust for load factors, e.g., extra weight, different angles of seat 100 and/or back portion 110.

In some examples, recline positioner 240 may be configured to receive a plurality of attachment means. The attachment means may be any means configured to attach recline positioner 240 to corresponding sidewall 114*a*, 114*b*. For example, the attachment means may be screws, fasteners, bolts, clips, or any appropriate attachment mechanism. Referring to FIG. 2, recline positioner 240 may include a plurality of openings 244 that correspond to a plurality of openings 245 in sidewall 114*a*. An attachment means may couple recline positioner 240 to an interior of sidewall 114*a*. In other embodiments, recline positioner 240 may be affixed to sidewall 114*a* via an adhesive.

FIGS. 3A and 3B depict the configuration of leg 130*a*, sidewall 114*a*, track 136, second foot 222, recline positioner 240, and recline adjustment pin 250. As shown in FIGS. 2, 3A, and 3B, recline positioner 240 may be configured to include a plurality of recesses 242. Recesses 242 may correspond to recline positions for seat 100 and specifically, back portion 110. These recline positions may be pre-determined and tested to ensure they comply with safety standards and shock standards.

In larger airplanes, a passenger may press a button and then the seat back portion is able to recline and/or return to its original position depending on how much weight and/or pressure the passenger applies to the seat back. Typically, the seat back may glide smoothly and freely along a track until it hits a backstop. In other words, between the original position and the maximum recline, the seat back may recline at any intermediate position. As mentioned above, traditional helicopter seats cannot freely recline similarly to commercial airplane seats. Helicopter seats are designed to withstand much more impact than commercial airplane seats and their locked positions are tested to comply with safety standards and energy absorption standards, i.e., shock standards as discussed above. Traditional helicopter seats may be locked in a standard positon so they are unable to recline as it may be too difficult to configure the seats to recline while maintaining safety standards. The use of recline positioner 240 and plurality of recesses 242 may allow passengers to recline their seats to any of the pre-determined positions and keep the seats reclined during takeoff and landing without impacting the safety and/or energy absorbance of the seats. In addition to, or alternatively, the use of recline positioner 240 and plurality of recesses 242 may allow the operator and/or manufacturer to certify the seat to allow the passenger to sit in any on the pre-determined positions at any and all stages of flight. The operator and/or manufacturer may certify the seat by passing testing at one or more of the pre-determined positions.

As discussed above, second foot 222 may slide along track 136. Second foot 222 may keep seat 100 from moving, except along track 136 when energy absorbing member 210 is activated. In some examples, leg 130*a* may include an opening (not shown) and second foot 222 may include an opening 223 for receiving recline adjustment pin 250. FIG. 3A shows recline adjustment pin 250 in a locked state. Recline adjustment pin 250 may fit through an opening of leg 130*a* and then through opening 223 of second foot 222. Once recline adjustment pin 250 passes through opening 223 of second foot 222, recline adjustment pin 250 may fit into one of the plurality of recesses 242 and then abut an interior of sidewall 114*a*. FIG. 3B depicts recline adjustment pin 250 in an adjustable position. In the adjustable position, a passenger may pull recline adjustment pin 250 in a direction away from recline positioner 240. While recline adjustment pin 250 is pulled out of recline positioner 240, the passenger may allow back portion 110 of seat 100 to recline or move to any of the plurality of recesses 242, depending on the recline position the passenger desires. Reline adjustment pin 250 may then be pushed back towards recline positioner 240 so that recline adjustment pin 250 may fit into one of recesses 242. Referring to FIG. 3B, recline positioner 240 may include a backstop 243, e.g., a tab, to prevent recline adjustment pin 250 from being completely pulled out from recline positioner 240 during movement of recline adjustment pin 250 to different recesses 242 of recline positioner 240.

Recline positioner 240 may have any shape or configuration so that recline positioner 240 may be positioned between leg 130*a* and sidewall 114*a*. For example, recline positioner 240 may have a generally rectangular shape, a generally square shape, or a generally triangular shape. Plurality of recesses 242 may have any shape or configuration to receive a portion of recline adjustment pin 250. For example, each of the plurality of recesses 242 may have a generally round or circular shape to receive a portion of recline adjustment pin 250.

FIGS. 4A and 4B depict an alternative configuration of a seat 400 according to the present disclosure. In FIGS. 4A and 4B, seat 400 may include a back portion 410, a seat portion 420, and a plurality of legs 430*a*, 430*b*. Each leg 430*a*, 430*b* may include a foot portion 432*a*, 432*b*. Back portion 410 may include a plurality of sidewalls 414*a*, 414*b*, and a top wall 416. As shown in FIG. 4A, seat 400 may include a first leg 430*a* and a second leg 430*b*. FIG. 4B shows a rear view of seat 400. In some embodiments, legs 430*a*, 430*b* may be attached to sidewalls 414*a*, 414*b*. Referring to FIGS. 4A and 4B, first leg 430*a* may be attached to sidewall 414*a* and second leg 430*b* may be attached to sidewall 414*b*. Descriptions of the components for seat 100 above may also apply to the corresponding components of seat 400 as depicted in FIGS. 4A and 4B.

Seat 400 may include recline mechanisms 500. As shown in FIGS. 4A and 4B, seat 400 may include a plurality of recline mechanisms 500, where first leg 430*a* may be attached to sidewall 414*a* by a first recline mechanism 500 and second leg 430*b* may be attached to sidewall 414*b* by a second recline mechanism 500 (not shown). In some embodiments, legs 430*a*, 430*b* may be attached to an exterior portion of sidewalls 414*a*, 414*b* (FIG. 4B).

FIG. 5 depicts the components of recline mechanism 500. While FIG. 5 shows recline mechanism 500, sidewall 414*a* and leg 430*a*, the discussion below may also apply to the use of recline mechanism 500 with sidewall 414*b* and leg 430*b*. Referring to FIGS. 6, 7A, and 7B, recline mechanism 500 may include an adapter 520, a recline positioner 540, and a recline adjustment pin 550 (FIG. 6). Leg 430*a* may include a track 432. Track 432 may be configured to receive a portion of recline positioner 540. In some examples, recline positioner 540 may include an insert 541. Insert 541 may be configured to correspond to a portion of track 432. Referring to FIGS. 7A and 7B, insert 541 may fit into track 432 and allow recline positioner 540 to move along track 432.

Adapter 520 may have any appropriate shape and/or configuration such that adapter 520 may abut against a portion of sidewall 414*a*. For example, adapter 520 may have a generally square shape or a generally rectangular shape. Referring to FIGS. 6, 7A, and 7B, adapter 520 and sidewall 414*a* may be configured to receive recline adjustment pin 550. For example, adapter 520 and sidewall 414*a* may each include an opening for receiving recline adjustment pin 550. Referring to FIG. 6, adapter 520 may include an opening 521 and sidewall 414*a* may include an opening 415. FIG. 7A shows recline adjustment pin 550 in a locked state. Recline adjustment pin 550 may fit through opening 521 of adapter 520 and then through opening 415 of sidewall 414*a*. Once recline adjustment pin 550 passes through opening 415 of sidewall 414*a*, recline adjustment pin 550 may fit into one of the plurality of recesses 542 and then abut an interior portion of recline positioner 540. The discussion of plurality of recesses 242 above in regards to FIGS. 2, 3A, and 3B, may be applicable to plurality of recesses 542 in FIGS. 6, 7A, and 7B. FIG. 7B depicts recline adjustment pin 550 in an adjustable position. In the adjustable position, a passenger may pull recline adjustment pin 550 in a direction away from recline positioner 540. While recline adjustment pin 550 is pulled out of recline positioner 540, the passenger may allow back portion 410 of seat 400 to recline or move to a position corresponding to any of the plurality of recesses 542, depending on the recline position the passenger desires. Recline adjustment pin 550 may then be pushed back towards recline position 540 so that recline adjustment pin 550 may fit into one of the recesses 542. Referring to FIG. 7B, recline positioner 540 may include a backstop 543, e.g, a tab, to prevent recline adjustment pin 550 from being completely pulled out from recline positioner 540 during movement of recline adjustment pin 550 to different recesses 542 of recline positioner 540. In some examples, recline positioner 540 may move along track 432. For example, as the passenger adjusts the recline of seat 400 by moving recline adjustment pin 550 to different recesses 542, recline positioner 540 may move along track 432.

As shown in FIG. 5, seat 400 may include a pivot 530. For example, pivot 530 may be located closer to seat portion 420, as compared to pivot 230 in FIGS. 1A and 1B. Pivot 530 may function as a fulcrum for seat 400. In other words, pivot 530 does not move, but allows a portion of seat 400, e.g., back portion 410 or seat portion 420, to move. Pivot 530 may function similarly to a hinge. In some embodiments, pivot 530 may be reinforced to adjust for load factors, e.g., extra weight, different angles of seat 400, back portion 410, and/or seat portion 420.

As described above, each leg of the seat may include a recline mechanism. For example, referring to FIG. 1B, leg 130*a* may have a recline mechanism 200 and a recline adjustment pin 250 and leg 130*b* may have a recline mechanism 200 and a recline adjustment pin 250. In some examples, both recline adjustment pins 250 on each leg may be coupled together, e.g., tied together, so that a passenger may adjust both recline adjustment pins 250 simultaneously. In such an embodiment, the recline mechanisms 200 may be connected to an actuation means, e.g., a spring, that may be accessible to the passenger via a lever or a button. For example, a lever or a button may be located on a portion of seat 100, leg 130*a*, or leg 130*b*. Once the passenger depresses the lever or button, recline adjustment pins 250, which may be spring-loaded or gas-loaded, may simultaneously pull away from their respective sidewall of the seat. The passenger may then recline the seat to a desired position according to one of the plurality of recesses 242 in recline positioner 240 and then as the passenger releases the lever or button, recline adjustment pins 250 may push back towards their respective sidewall and into the appropriate recess 242 in recline positioner 240. This discussion may also be applied to seat 400 depicted in FIG. 4B and recline mechanism 500, recline positioner 540, and recline adjustment pin 550 depicted in FIG. 6.

FIG. 8 illustrates yet another embodiment of a seat according to the present disclosure. Seat 800 may include any of the components as discussed herein. As shown in FIG. 8, seat 800 may also include a means for returning seat 800 to a specific position, e.g., its original position or recline Seat 800 may include an actuating means 810, e.g., a torsion spring, that may be accessible to the passenger via a lever or a button. For example, once the user depresses the lever or button, seat 800 may to reset to its original position.

Components of the seats may be formed of any suitable material with sufficient weight and components to withstand energy and impact from air flight and/or with any characteristics suitable for use in an aircraft. The back portion, seat portion, and/or legs, may include plastic materials, metals, metallic materials, polymers, composite materials, or combinations thereof. For example, the back portion, seat portion, and/or legs may include aluminum, carbon fiber, plastic, or combinations thereof. Components of the recline mechanisms may be made from plastic materials, metals, chemical composites, alloys, or combinations thereof. For example, the recline adjustment pin may comprise a metal or alloy. The recline adjustment pin may be steel. In some examples, the feet and adapter of the recline mechanism may be plastic. In some examples, the recline positioner may comprise a metal or alloy. The recline positioner may comprise aluminum. In some embodiments, the components of the seat, legs, and/or recline mechanism may be made of metal machined to a desired configuration.

The description above and examples are illustrative and are not intended to be restrictive. One of ordinary skill in the art may make numerous modifications and/or changes without departing from the general scope of the invention. For example, and as has been referenced, aspects of above-described embodiments may be used in any suitable combination with each other. Additionally, portions of the above-described embodiments may be removed without departing from the scope of the invention. In addition, modifications may be made to adapt a particular situation or aspect to the teachings of the various embodiments without departing from their scope. Many other embodiments will also be apparent to those of skill in the art upon reviewing the above description.

What is claimed is:

1. A reclining seat comprising:
a back portion including a plurality of sidewalls;
a seat portion;
a plurality of legs, wherein each of the plurality of legs is attached to a sidewall of the back portion;
a pivot configured to allow a portion of the seat portion to recline; and
a recline mechanism, the recline mechanism including:
a recline positioner including a plurality of recesses, and
a recline adjustment pin, wherein the recline adjustment pin is configured to fit into at least one of the plurality of recesses of the recline positioner;

wherein each leg of the plurality of legs includes a track for receiving at least one component of the recline mechanism, wherein the track is configured to guide sliding movement of the at least one component of the recline mechanism between discrete recline positions corresponding to the plurality of recesses;

wherein an energy absorbing member is positioned within the track.

2. The reclining seat of claim 1, wherein the back portion includes a first sidewall and a second sidewall, and the plurality of legs includes a first leg and a second leg, and wherein the first leg is attached to a first sidewall and the second leg is attached to the second sidewall.

3. The reclining seat of claim 2, wherein the first leg is attached an interior portion of the first sidewall and the second leg is attached to an interior portion of the second sidewall.

4. The reclining seat of claim 2, wherein the first leg is attached to an exterior portion of the first sidewall and the second leg is attached to an exterior portion of the second sidewall.

5. The reclining seat of claim 1, wherein the recline mechanism further comprises a plurality of feet.

6. The reclining seat of claim 1, wherein the recline mechanism further comprises an adapter for receiving the recline adjustment pin.

7. The reclining seat of claim 1, wherein each recess of the plurality of recesses corresponds to a pre-determined recline position.

8. The reclining seat of claim 1, wherein the recline mechanism is a first recline mechanism and the seat portion includes a second recline mechanism.

9. A seat for an aircraft, the seat comprising:

a back portion;

a seat portion;

a plurality of legs;

a pivot configured to allow a portion of the seat to recline; and a plurality of recline mechanisms, each recline mechanism including:

an energy absorbing member;

a plurality of feet;

a recline positioner including a plurality of recesses, and a recline adjustment pin;

wherein each leg of the plurality of legs includes a track for receiving at least one of the plurality of feet, wherein the track is configured to guide sliding movement of the at least one of the plurality of feet between discrete recline positions corresponding to the plurality of recesses;

wherein the energy absorbing member is positioned within the track.

10. The seat of claim 9, wherein the recline adjustment pin is configured to fit into at least one of the plurality of recesses of the recline positioner.

11. The seat of claim 9, wherein the plurality of recesses correspond to pre-determined recline positions.

12. The seat of claim 9, wherein the back portion includes a first sidewall and a second sidewall and the plurality of legs includes a first leg and a second leg, and wherein the first leg is attached to an interior portion of the first sidewall and the second leg is attached to an interior portion of the second sidewall.

13. The seat of claim 12, wherein the seat includes at least two recline mechanism, a first recline mechanism attaching the first leg to the first sidewall and a second recline mechanism attaching the second leg to the second sidewall.

14. A seat for an aircraft, the seat comprising:

a back portion;

a seat portion;

a plurality of legs;

a pivot configured to allow a portion of the seat to recline; and a plurality of recline mechanisms, each recline mechanism including:

an adapter including an insert portion, a recline positioner including a plurality of recesses, and a recline adjustment pin, wherein each of the plurality of legs includes a track for receiving the insert portion of the adapter, wherein the track is configured to guide sliding movement of the insert portion between discrete recline positions corresponding to the plurality of recesses;

wherein an energy absorbing member is positioned within the track.

15. The seat of claim 14, wherein the recline adjustment pin is configured to fit into at least one of the plurality of recesses of the recline positioner.

16. The seat of claim 14, wherein the plurality of recesses correspond to pre-determined recline positions.

17. The seat of claim 14, wherein the back portion includes a first sidewall and a second sidewall and the plurality of legs includes a first leg and a second leg, and wherein the first leg is attached to an exterior portion of the first sidewall and the second leg is attached to an exterior portion of the second sidewall.

18. The seat of claim 17, wherein the seat includes at least two recline mechanisms, wherein a first recline mechanism attaches the first leg to the first sidewall and a second recline mechanism attaches the second leg to the second sidewall.

* * * * *